(12) United States Patent
Christensen et al.

(10) Patent No.: US 7,094,363 B2
(45) Date of Patent: Aug. 22, 2006

(54) PROCESS FOR THE PREPARATION OF A SYNTHESIS GAS

(75) Inventors: Peter Seier Christensen, Copenhagen (DK); Thomas Rostrup Nielsen, Holte (DK); Niels Erikstrup, Frederiksberg (DK); Kim Aasberg-Petersen, Holte (DK); Jens-Henrik Bak Hansen, Frederiksberg (DK); Ib Dybkjaer, Copenhagen (DK)

(73) Assignee: Haldor Topsoe A/S, Lyngby (DK)

( * ) Notice: Subject to any disclaimer, the term of this patent is extended or adjusted under 35 U.S.C. 154(b) by 370 days.

(21) Appl. No.: 10/668,295

(22) Filed: Sep. 24, 2003

(65) Prior Publication Data

US 2004/0065014 A1    Apr. 8, 2004

(30) Foreign Application Priority Data

Sep. 26, 2002   (DK) ............................... 2002 01431

(51) Int. Cl.
   *C01B 3/38*    (2006.01)
(52) U.S. Cl. ..................................... 252/373
(58) Field of Classification Search ............... 252/373
   See application file for complete search history.

(56) References Cited

U.S. PATENT DOCUMENTS

| | | | |
|---|---|---|---|
| 3,743,488 A | 7/1973 | Bogart | |
| 3,919,114 A * | 11/1975 | Reynolds | ..................... 252/373 |
| 4,400,309 A | 8/1983 | McMahon et al. | |
| 4,618,451 A | 10/1986 | Gent | |
| 4,830,834 A | 5/1989 | Stahl et al. | |
| 4,844,837 A | 7/1989 | Heck | |
| 4,959,079 A * | 9/1990 | Grotz et al. | ............... 48/198.7 |
| 5,004,592 A | 4/1991 | Pinto | |
| 5,030,661 A | 7/1991 | Lywood | |
| 5,167,865 A | 12/1992 | Igarashi et al. | |
| 5,429,809 A | 7/1995 | Stahl et al. | |
| 5,486,313 A | 1/1996 | De Jong et al. | |
| 5,567,397 A | 10/1996 | Le Gal et al. | |
| 5,932,141 A | 8/1999 | Rostrop-Nielsen et al. | |
| 6,110,979 A * | 8/2000 | Nataraj et al. | ............... 518/704 |
| 6,375,916 B1 | 4/2002 | Christensen et al. | |

(Continued)

FOREIGN PATENT DOCUMENTS

DE        195 34 433        10/1996

(Continued)

OTHER PUBLICATIONS

I. Dybjkaer, "Tubular Reforming and Autothermal Reforming of a Natural Gas—An Overview of Available Processes," Fuel Processing Technology, vol. 42, No. 2/03, 1995, pp. 85-107, no month.

Primary Examiner—Wayne A. Langel
(74) Attorney, Agent, or Firm—Dickstein Shapiro LLP

(57) ABSTRACT

Process and apparatus for the preparation of synthesis gas by catalytic steam and/or $CO_2$ reforming of a hydrocarbon feedstock comprising the following steps:
  (a) heating the reaction mixture of hydrocarbon and steam and/or $CO_2$ in a heated steam reforming unit integrated with the flue gas containing waste heat section from the fired tubular reformer in which reforming of the reaction mixture takes place by contact with a solid reforming catalyst
  (b) feeding the partially steam reformed mixture to the fired tubular reformer and further reforming the mixture to the desired composition and temperature, wherein the heated steam reforming unit comprises a piping system containing reaction sections with solid reforming catalyst comprising catalyst pellets and/or catalysed structured elements, the piping system being part of the process gas piping system integrated with the flue gas-containing waste heat section.

7 Claims, 2 Drawing Sheets

U.S. PATENT DOCUMENTS

| | | |
|---|---|---|
| 6,444,712 B1 | 9/2002 | Janda |
| 6,525,104 B1 | 2/2003 | Abbott |
| 6,746,624 B1 | 6/2004 | Christensen et al. |
| 2001/0051662 A1 | 12/2001 | Arcuri et al. |
| 2002/0006968 A1 | 1/2002 | Abbott |

FOREIGN PATENT DOCUMENTS

| | | |
|---|---|---|
| EP | 0305203 | 3/1989 |
| EP | 0440258 | 8/1991 |
| EP | 0583211 | 2/1994 |
| EP | 0 855 366 | 7/1998 |
| EP | 1 069 070 | 1/2001 |
| EP | 1 241 130 A | 9/2002 |
| JP | 48-084808 | 11/1973 |
| JP | 52-065190 | 5/1977 |
| JP | 53-082690 | 7/1978 |
| JP | 61-097105 | 5/1986 |
| JP | 62-216634 | 9/1987 |
| JP | 05155602 | 6/1993 |
| WO | WO 200003579 | 1/2000 |
| WO | WO 00/58242 A | 10/2000 |

* cited by examiner

PROCESS FOR THE PREPARATION OF A SYNTHESIS GAS

The present invention relates to a process and an apparatus for the preparation of synthesis gas. The preparation process includes catalytic steam and/or carbon dioxide reforming of a hydrocarbon feedstock. In particular, the invention provides an improved process of the above type including the steps of heated steam reforming of a hydrocarbon steam mixture in contact with a solid catalyst having activity in steam reforming and subsequently reforming the partially reformed effluent in a fired steam reformer.

Catalytic steam and/or carbon dioxide reforming of a hydrocarbon feedstock is a process in which a hydrocarbon feedstock is reacted with steam and/or carbon dioxide forming a hydrogen and carbon monoxide rich synthesis gas. Key reactions are:

steam reforming of hydrocarbons as illustrated below for methane:

$$CH_4 + H_2O \Leftrightarrow 3H_2 + CO \quad (1)$$

the steam and/or carbon dioxide reforming reaction is accompanied by the Shift Reaction:

$$CO + H_2O \Leftrightarrow H_2 + CO_2. \quad (2)$$

The above two reactions are in most cases close to equilibrium. If higher hydrocarbons (hydrocarbons with 2 or more hydrocarbon atoms) are present in the reformer unit feed stream, these are also steam reformed according to reactions similar to the above and as illustrated below:

$$C_nH_m + nH_2O \Rightarrow nCO + \tfrac{1}{2}(m+2n)H_2 \ (>=2) \quad (3)$$

Carbon dioxide reforming of hydrocarbons as illustrated below for methane:

$$CH_4 + CO_2 \Leftrightarrow 2H_2 + 2CO \quad (4)$$

Combined steam and carbon dioxide reforming of hydrocarbons as illustrated below for methane:

$$\tfrac{3}{4}CH_4 + \tfrac{1}{4}CO_2 + \tfrac{1}{2}H_2O \Leftrightarrow 2H_2 + CO. \quad (5)$$

The ratio of steam to carbon dioxide can be varied to obtain the desired synthesis gas composition.

Partial steam reforming upstream of a fired steam reformer in the form of pre-reforming of a hydrocarbon feedstock in the preparation of synthesis gas is well known in the art. Pre-reforming is generally employed with hydrocarbon feed containing higher hydrocarbons or for increasing the capacity of existing reformer plants. Process gas of the hydrocarbon feedstock and steam and/or $CO_2$ is thereby introduced in a pre-reformer at temperatures of about 450° C. to 550° C. By the steam reforming reactions proceeding in the pre-reformer, the temperature in the process gas usually decreases or increases slightly when carrying out the pre-reforming process depending on the hydrocarbon feedstock as it is an adiabatic operation. Adiabatic pre-reforming is typically carried out in a conventional reactor vessel containing conventional catalyst pellets.

In industrial synthesis gas preparation plants, the pre-reformed process gas to which steam and/or $CO_2$ may be added is subsequently reheated to the desired inlet temperature to the fired steam reformer by heat exchange with hot flue gas from the fired steam reformer. The usual inlet temperature into an industrial reformer is between 600° C. and 700° C. Systems can be designed allowing operation with inlet temperatures outside this range.

Introducing a flue gas heated steam reforming step in between the pre-reformer and the fired steam reformer will result in an increased utilisation of the flue gas heat content, while it is possible to keep the inlet temperature between the usual 600° C. and 700° C. Allowing a higher inlet temperature will increase the utilisation of the flue gas heat content. More heat from the flue gas is used since heat is not only used to heat the process gas but also to carry out the endothermic reforming reaction partially.

Increased utilisation of the heat content in the flue gas for reforming is desirable as it reduces the size of the fired reformer and reduces the waste heat used for steam generating thereby limiting the steam export, which may be undesirable.

Improved utilisation of heat in the hot flue gas from the fired steam reformer is disclosed in EP patent application No. 855,366, incorporated herein by reference. This publication describes a process, whereby process gas to the steam reformer is partly reformed in a pre-heater coil provided with a thin film of steam reforming catalyst on the wall of the coil. A high amount of valuable heat in the flue gas is then transferred to and absorbed by the process gas through endothermic steam reforming reactions proceeding on the wall-coated catalyst. The coil dimension and amount of catalyst is thereby adjusted to increase the exit temperature in the partially reformed process gas from the catalysed pre-heater coil to the required temperature at inlet to the fired steam reformer.

The main disadvantage of this process is decreasing catalyst activity at long time operation of the catalysed pre-heater coil. This results in a coil exit temperature above the maximum allowable gas temperature at the inlet of the fired steam reformer. The increased coil exit temperature is due to decreased heat absorption at diminished steam reforming in the gas. The catalyst has then to be reactivated or replaced with fresh catalyst on the coil wall. Replacement of catalyst in the pre-heater coil is a difficult and expensive operation when demounting the coil from the flue gas channel.

The objective disclosed in EP patent application No. 1,069,070, which is incorporated herein by reference is to improve long term operability of a steam reforming process of the above type by compensating a decreasing catalyst activity of the thin film catalyst applied to the wall of the pre-heater coil by means of an additional catalytic unit being easy to replace.

This publication discloses a process for the catalytic steam reforming of a hydrocarbon feedstock and includes steam reforming a hydrocarbon steam mixture in contact with a first steam reforming catalyst being arranged as a thin film on the wall of the catalysed pre-heater coil in a flue gas channel from a fired steam reformer. Contacting partially reformed effluent from the catalysed pre-heater coil with a second steam reforming catalyst in a fired steam reformer follows this step. The process includes the further step of contacting the partially reformed effluent with an intermediate reforming unit arranged between the outlet of the catalysed pre-heater coil in the flue gas channel and the inlet of the fired steam reformer.

Loss of activity in the catalysed pre-heater coil unit during long time operation is partially compensated for by steam reforming reactions in partially reformed effluent within the intermediate reforming unit. The intermediate unit is operated at substantially adiabatic conditions and compensates partially decreasing steam reforming activity of the thin film steam reforming catalyst on the catalysed pre-heater coil and the resulting temperature increase in the effluent from the catalysed pre-heater coil.

Besides providing the required temperature adjustment of the process gas below the maximum inlet temperature into the fired steam reformer at long term operation, a further advantage of the intermediate reformer unit is the siting of the unit outside the flue gas channel. To compensate decreasing activity in the catalysed pre-heater coil as described above, it will be necessary to replace or reactivate spent catalyst upstream the fired steam reformer. As mentioned earlier replacement of spent catalyst applied as a thin film to a coil within the flue gas channel is time consuming and expensive to handle.

By arranging an intermediate catalyst unit outside the flue gas channel, spent catalyst is then replaced in the intermediate reformer unit and the replacement operation is simplified considerably.

In a system where the catalysed pre-heater coil is designed such that the process gas leaving the coil is in chemical equilibrium at the desired outlet temperature, the intermediate reforming unit, when operated adiabatically, will not change the temperature or the gas composition. As the catalyst in the catalysed pre-heater coil deactivates the chemical reactions will not be in equilibrium. This means that less heat is used for carrying out the endothermic steam reforming reaction and given a virtually unchanged amount of heat transferred to the catalysed pre-heater coil, more heat is available for heating. This results in an increased outlet temperature from the coil. In this case the intermediate reforming unit will bring the gas composition closer to equilibrium thereby cooling the gas to a temperature close to the desired temperature achieved before deactivation of the catalyst in the catalysed pre-heater coil.

However, as the deactivation of the catalyst in the catalysed pre-heater coil becomes severe the resulting temperature increase becomes a problem. The temperature of the pre-heater coil increases, which may exceed design temperatures resulting in a smaller driving force for heat transfer from the flue gas leading to a smaller transferred duty with the consequence that the capacity of the total reforming system has decreased. The use of the intermediate reforming unit does not solve these issues and replacement of the thin film catalyst applied to the wall of the pre-heater coil becomes necessary.

The processes described in EP patent applications Nos. 855,366 and 1,069,070 both have the disadvantage of difficult replacement of the thin film catalyst on the wall of the catalysed pre-heater coil in the flue gas channel. EP patent applications No. 1,069,070 describes a partial solution, which prolongs the useful life of the thin film catalyst on the wall of the reheat coil in the waste heat section. However, deactivation of the thin film catalyst on the wall of the reheat coil in the waste heat section is expected with time to eventually necessitate replacement of this catalyst. As explained above this operation undesirable as it is time consuming and expensive.

U.S. Pat. No. 3,743,488 describes a process in which the hydrocarbon steam mixture is repeatedly heated in a flue gas steam and reacted in adiabatic reactors external to the flue gas stream with steam reforming catalyst pellets. This concept offers easier access for change of the catalyst in the external reactors. However, the use of many adiabatic reactor vessels is overall an expensive solution.

The process described in U.S. Pat. No. 4,959,079 is designed with the purpose of improved utilisation of heat in the hot flue gas from the fired steam reformer. In the process the process gas to the steam reformer is partly reformed in a pre-heated section of the reformer tube that extends from the radiant chamber. Valuable heat in the flue gas is then transferred to and absorbed by the process gas through endothermic steam reforming reactions. However, heat exchange in counter current flow between the flue gas and the reforming tube is poor. Introducing fins on the reforming tube increases the heat transfer. Despite this the amount of heat transfer possible is relatively limited if the reformer tube length is to be kept at a reasonable length.

The process of the invention solves the problems occurring with the prior art by providing an improved process including the step of steam and/or $CO_2$ reforming of a hydrocarbon steam mixture in contact with a solid catalyst having activity in steam reforming. The solid catalyst is arranged in piping system of a flue gas heated coil system constituting a heated steam reforming unit. Subsequently, the effluent from the heated steam reforming unit is contacted with a steam reforming catalyst in a fired steam reformer. By locating the steam reforming catalyst of the heated steam reforming unit as removable structured catalysts or catalyst pellets in the piping system of the heated steam reforming unit easy catalyst replacement is achieved, while at the same time achieving improved utilisation of the heat content in the flue gas for steam reforming.

Therefore the invention provides a process for the preparation of synthesis gas by catalytic steam and/or $CO_2$ reforming of a hydrocarbon feedstock comprising the following steps:

(a) heating the reaction mixture of hydrocarbon and steam and/or $CO_2$ in a heated steam reforming unit integrated with the flue gas containing waste heat section from the fired tubular reformer in which reforming of the reaction mixture takes place by contact with a solid reforming catalyst (b) feeding the partially steam reformed mixture to the fired tubular reformer and further reforming the mixture to the desired composition and temperature, wherein the heated steam reforming unit comprises a piping system containing reaction sections with solid reforming catalyst comprising catalyst pellets and/or catalysed structured elements, the piping system being part of the process gas piping system integrated with the flue gas-containing waste heat section.

The invention also concerns an apparatus for the preparation of synthesis gas according to the above process comprising the following:

(a) an adiabatic pre-reformer for optional pre-reforming of a mixture of hydrocarbon and steam and/or $CO_2$ (b) a fired tubular reformer with a flue gas-containing waste heat section for heating of a mixture of hydrocarbon and steam and/or $CO_2$ or of the pre-reformed mixture (c) a heated steam reforming unit integrated with the flue gas containing waste heat section from the fired tubular reformer, wherein the heated steam reforming unit comprises a piping system containing reaction sections with solid reforming catalyst comprising catalyst pellets and/or catalysed structured elements, the piping system being part of the process gas piping system integrated with the flue gas-containing waste heat section.

The various embodiments of the invention allow for easy replacement of the catalysed structured elements and/or catalyst pellets placed in the piping system, efficient heat transfer between the flue gas and the process gas, and an economically attractive design due to the high level of integration of functions.

The application of the process of the invention is not limited to temperature intervals of 600° C.–700° C.

The heated steam reforming unit is situated in the process gas piping system and is integrated with the flue gas-containing waste heat section from the fired tubular reformer. The piping system can be structured in various ways. The heated sections can consist of several parallel tubes connected to common feed and product headers. For instance, the process gas enters a heating coil through an inlet header followed by collection in an outlet header placed outside the heating section. This outlet header is connected to an inlet header for the next reheat coil section with a connecting element. The inlet and outlet headers and the transitional zone between the two headers form adiabatic zones in which reactions can take place i.e. adiabatic reaction sections. These sections are thus situated outside the heating section i.e. outside the flue gas containing waste heat section, while being part of the process gas piping system integrated with the flue gas-containing waste heat section.

The inlet and outlet headers and thus the adiabatic reaction sections are easily accessible since they are placed outside the flue-gas containing waste heat section. Replacing the catalysed structured elements in the adiabatic reaction sections is therefore a simple process.

In the inventive process the solid catalyst comprises catalysed hardware in the form of catalyst pellets and/or structured elements with a catalytic layer of steam reforming catalyst. The catalysed structured elements and/or the catalyst pellets are placed in any location in the heated sections and in the adiabatic reaction sections.

The term catalysed structured elements is used for a catalyst system, where a layer of catalyst is fixed on a surface of another material. The other material serves as the supporting structure giving strength to the system. This allows to design catalyst shapes, which would not have sufficient mechanical strength in itself. The other material can be, but is not limited to, metallic or ceramic. Layouts may comprise of, but are not limited to, monoliths, cross corrugated structures, high surface area structured elements, foams, plates, structures attached to the tube wall, or other suitable shapes.

In particular structure elements can be characterised by being devices comprising a plurality of layers with flow channels present between the adjoining layers. The layers are shaped in such a way that placing the adjoining layers together results in an element in which the flow channels can, for instance, cross each other or can form straight channels. Structured elements are further described in for instance U.S. Pat. Nos. 5,536,699, 4,985,230, EP patent application Nos. 396,650, 433,223 and 208,929, all of which are incorporated herein by reference.

Two types of structured elements are particularly suitable for the inventive process—the straight-channelled elements and the cross-corrugated elements.

The straight-channelled elements are best suited for adiabatic conditions and various geometries of these elements are possible. For example, straight channel monoliths are suitable for use in the process of the invention.

Cross-corrugated elements allow efficient heat transfer from the pipe wall to the gas stream. They are also suitable for use in the process of the invention especially in the heated sections.

Other catalysed structured elements can also be applied in the process of the invention such as high surface structured elements. Other means of introducing additional catalyst activity into the system can be used in combination with the catalyst pellets and/or the catalysed structured elements in the process of the invention e.g. catalyst attached to the tube wall such as a thin film.

It may be desirable to fix the solid reforming catalyst (i.e. the catalysed structured elements and/or catalyst pellets) in position, such that the solid catalyst does not move undesirably for instance during operation of the plant. This may be achieved in many ways. The solid catalyst can be held in place by elements designed to immobilise the solid catalyst (e.g. fixing the solid catalyst between screens). The solid catalyst can also be fixed in position by being attached to the tube wall of the piping system in the reaction sections of the reforming unit (e.g. temporary attachment allowing easy replacement).

In a specific embodiment of the invention, the first section of the heated steam reforming unit does not contain any catalyst and functions as a heating coil. The heated reaction mixture is subsequently transferred to a second section of the heated steam reforming unit containing catalyst designed to allow the process gas to reach the desired outlet gas temperature and composition. The catalyst pellets and/or catalysed structured elements are located in the adiabatic reaction sections and various types of solid reforming catalyst in the heated sections of the second section of the heated steam reforming unit.

In an embodiment of the invention, the heated steam reforming unit is comprised of several repetitions of sections without catalyst followed by sections with catalyst. This repetitive arrangement can commence with either a section without catalyst or with a section with catalyst. Likewise the last section can be either without catalyst or with catalyst, the adiabatic reactions containing catalysed structured elements or catalyst pellets.

The number of heating sections followed by reforming sections containing catalytic elements can be varied in the process of the invention.

In another embodiment of the invention, in the heated steam reforming unit the catalyst pellets and/or catalysed structured elements are in the heated sections and are separated e.g. by spacers. This allows a larger degree of freedom in designing the system for a desired pressure drop and it decouples the amount of catalyst used from the heat transfer area required.

Any of the above catalyst types can be used in combination.

Figure 1:
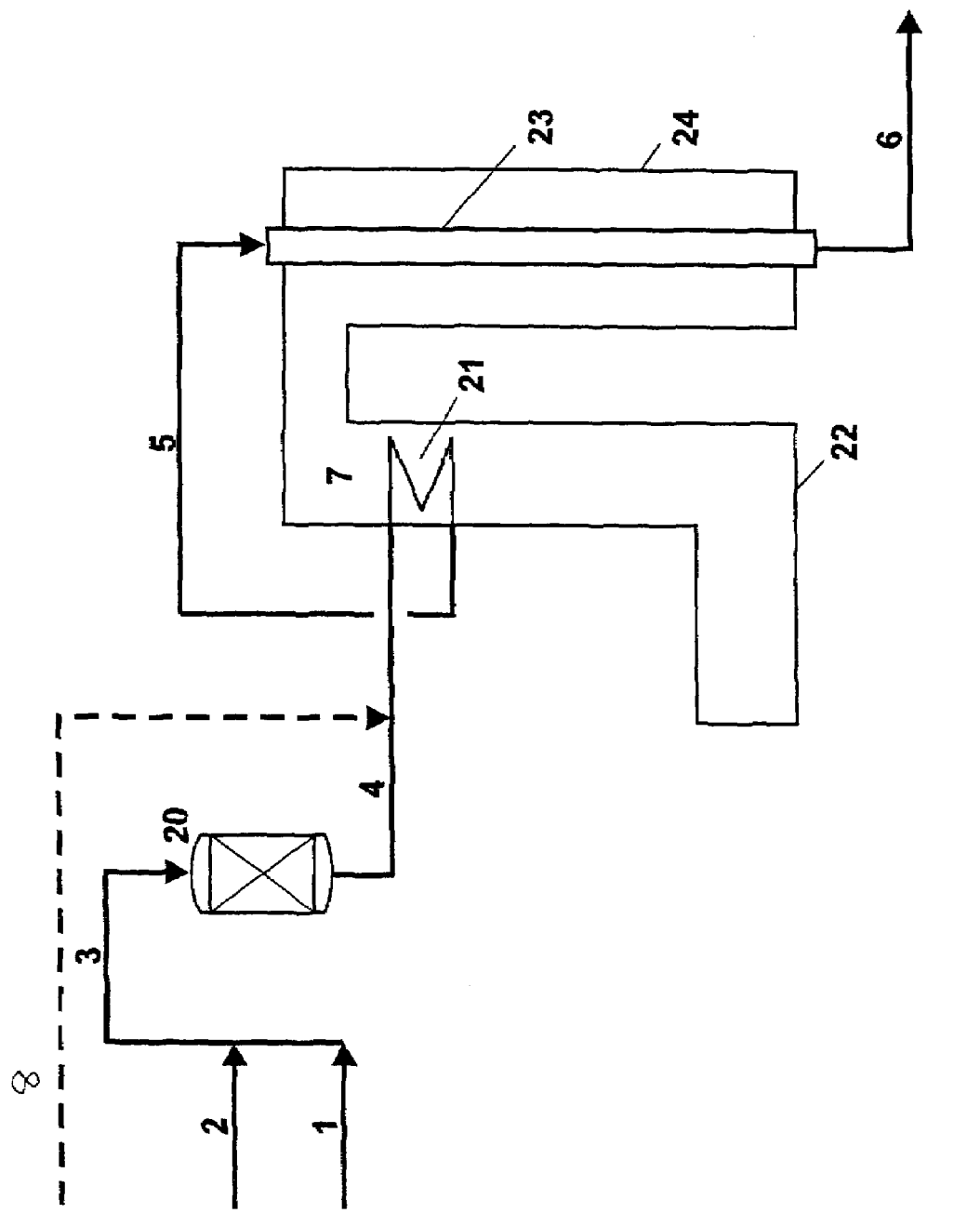
FIG. 1 shows a conventional system with a pre-reformer having a reheating section and a reformer.

FIG. 1 depicts a conventional system, where process gas of hydrocarbon feedstock [1] and steam [2] is introduced in a pre-reformer [20] at temperatures of about 450° C. to 550° C. By the steam reforming reactions proceeding in the pre-reformer, the temperature in the process gas usually decreases or increases slightly when carrying out the pre-reforming process depending on the hydrocarbon feedstock, feedstock as it is an adiabatic operation. The pre-reformed product stream [4] and optionally carbon dioxide [8] enter the heating coil. The optional addition of $CO_2$ is indicated by a dashed line.

In industrial synthesis gas preparation plants, the pre-reformed process gas, to which steam and/or $CO_2$ can be added, is subsequently reheated to the desired inlet temperature to the fired steam reformer [24] by heat exchange with hot flue gas [7] from the fired reformer [24]. The usual inlet temperature into an industrial reformer is between 500° C. and 700° C.

Figure 2:
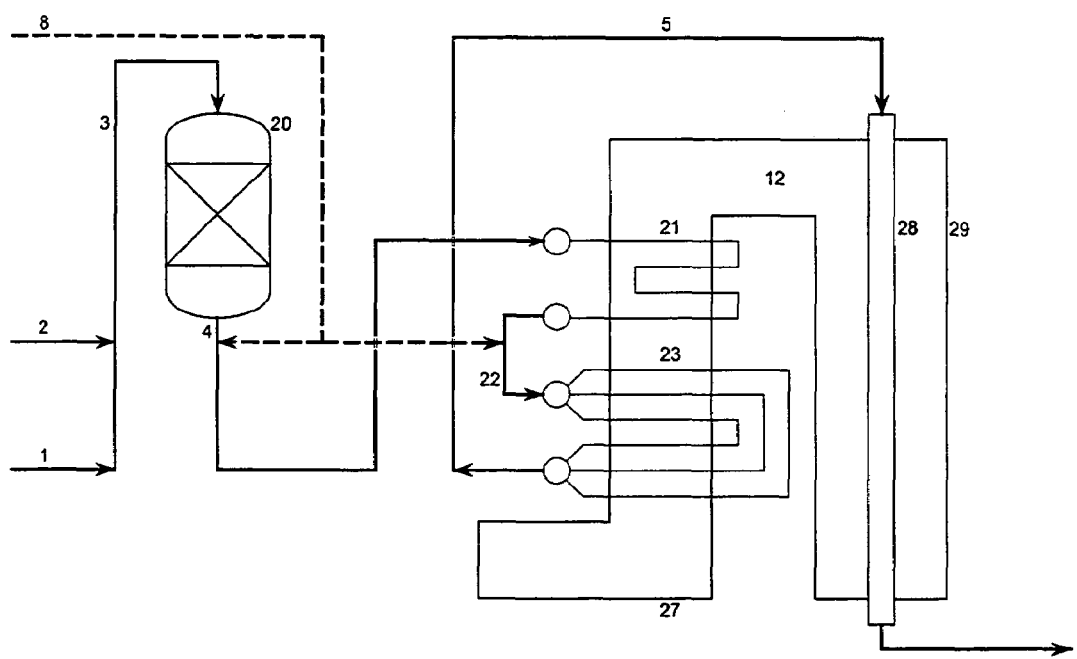
FIG. 2 shows a system representing an embodiment of the process of the invention.

FIG. 2 illustrates an embodiment of the invention, where the heated steam reforming unit is comprised of one heating section without catalyst [21] and one section with catalyst [23].

Hydrocarbon feed [1] is mixed with process steam [2] forming the feed stream [3] to the adiabatic pre-reformer [20]. This step is optional and can be left out if it is not required. Steam and/or $CO_2$ [8] can then be added if desired to the pre-reformed product stream [4] or in the case where pre-reforming is not required, to the hydrocarbon and steam feed stream [3]. The mixture then enters a heating section without catalyst of the heated steam reforming unit [21] integrated with the flue gas section [27] from a fired tubular reformer [29] utilising the heat content of the flue gas [12] to heat the process stream. In heating section [21], the pre-reformed stream [4] is heated to for example 600° C.–700° C. before being collected in a header system [22]. The header system [22] is an adiabatic reaction zone and contains steam reforming catalyst pellets or structured elements catalysed with steam reforming catalyst. Heated stream [4] is then fed to a heating section with solid reforming catalyst, for instance catalyst pellets, of the heated steam reforming unit [23] integrated with the flue gas section [27]. Carbon dioxide [8] may be added to the mixture if required at this point. Additional heat is transferred from the flue gas to the process gas and the heat is utilised to reform the hydrocarbon content of the process stream and forming stream [5].

In this embodiment the heated steam reforming unit comprises sections [21] and [23] and header system [22].

Several more heating sections and reaction sections can be included at this point. The number of heating sections and reaction sections depends on the desired effect e.g. gas composition or equilibrium gas temperature.

If desired steam and/or $CO_2$ [8] can be added to each section and/or header system of the heated steam reforming unit.

If no further heating sections and reaction sections are required, steam [5] is led to the reforming tubes [28] situated in the fired tubular reformer [29]. Here additional heat is added to the process by firing fuel, and the desired reformed product is collected from the reforming tubes.

A suitable structured element used in the embodiment described above is the cross corrugated element.

The advantages of the apparatus and the process of the invention are several. The most important advantage is that the solid reforming catalyst can easily be replaced because it is present in easily accessible tubes and is only present in the tubes in the places where it is required. In the process of the invention the amount of catalyst necessary for the process is completely decoupled from the necessary heat transfer area.

EXAMPLES

Example 1

A comparison of the amount of catalyst required in a process of the invention as compared to a conventional process was made.

The conventional process was carried out by feeding hydrocarbon and steam into a pre-reformer followed by heating in a coil in the flue gas-containing waste heat section of a tubular reformer. Initially the feed was heated prior to passage through the first adiabatic reactor containing steam reforming catalyst pellets. Subsequently, the mixture was reheated and reacted again, the number of reheating and reaction steps repeated until four reheating steps and four reaction steps altogether had been carried out.

In the a process of the invention a feed consisting of hydrocarbon and steam was fed into a pre-reformer followed by passage through a piping system constituting the heated steam reforming unit integrated with the flue gas-containing waste heat section of a tubular reformer. Initially the feed was heated prior to passage through the first adiabatic header system containing a catalysed structured element and making up a reaction section. Subsequently, the mixture was reheated and reacted again, the number of reheating and reaction steps repeated until four reheating steps and four reaction steps altogether had been carried out.

The initial inlet temperature to the first reheating coil after the pre-reformer was 450° C. and the final outlet temperature was 650° C. for both systems. Both systems were feed with a flow rate of 270 $Nm^3/h$ was led to the two steam reforming systems, and the product was withdrawn at a rate of 319 $Nm^3/h$. The carbon flow rate was 100 $Nm^3/h$. The space velocity of the conventional process was 10.000–15.000 $Nm^3$ $C_1/hr$ $m^3$ catalyst. In the process of the invention the space velocity can be increased to 100.000–1.000.000 $Nm^3$ $C_1/hr$ $m^3$ catalyst because the catalyst is supported on a structured element.

The catalyst amount used in the process of the invention was 0.1–1.0 kg, while 6.7–10 kg was used in the conventional process.

The process of the invention allows the use of orders of magnitude less catalyst, allowing simplicity in design leading to superior economics.

Example 2

This example is based on the systems described in FIGS. 1 and 2, without $CO_2$ addition. A waste heat boiler was placed in the flue gas section of the reformer in order to obtain overall high energy efficiency by recovering the heat content in the flue gas.

The figures shown in table 2 indicate that substantial savings are obtainable using the process of the invention.

TABLE 2

Comparison of the duty distribution in a Conventional process compared with process of the invention.

| | Conventional | Invention |
|---|---|---|
| Primary reformer duty, Gcal/h | 40.3 | 33.6 |
| Reheat coil duty, Gcal/h | 5.3 | n.a. |
| Heated coil steam reformer unit duty, Gcal/h | n.a. | 12.0 |
| Total Reforming Duty, Gcal/h | 45.6 | 45.6 |
| Flue Gas Flow, Nm3/h | 105166 | 92054 |
| Waste heat boiler duty, Gcal/h | 9.8 | 2.0 |

The results showed that the duty required by the reformer was much less in the case where the process of the invention was used. A smaller reformer can therefore be used in the process of the invention. The amount of steam generated was also reduced in addition to a flue gas flow rate reduction. Altogether substantial savings are achieved.

The invention claimed is:

1. Process for the preparation of synthesis gas by catalytic steam and/or $CO_2$ reforming of a hydrocarbon feedstock comprising the following steps:
   (a) heating the reaction mixture of hydrocarbon and steam and/or $CO_2$ in a heated steam reforming unit integrated with the flue gas containing waste heat section from the fired tubular reformer in which reforming of the reaction mixture takes place in the heated steam reforming unit by contact with a solid reforming catalyst to produce a partially steam reformed mixture; and (b) feeding the partially steam reformed mixture to the fired tubular reformer and further reforming the mixture to the desired composition and temperature, wherein the heated steam reforming unit comprises a piping system containing reaction sections with solid reforming catalyst comprising catalyst pellets and/or catalysed structured elements, the piping system being part of the process gas piping system integrated with the flue gas-containing waste heat section.

2. Process according to claim 1, wherein the heated steam reforming unit is comprised of heating sections with or without solid reforming catalyst and adiabatic reaction sections containing catalysed structured elements coated with a layer of steam reforming catalyst, both sections being part of the process gas piping system integrated with the flue gas-containing waste heat section.

3. Process according to claim 1, wherein the heated steam reforming unit is comprised of heated, reaction sections with catalyst pellets, the heated sections being part of the process gas piping system integrated with the flue gas-containing waste heat section.

4. Process according to claim 1, wherein the reaction mixture of hydrocarbon and steam and/or $CO_2$ is pre-reformed prior to heating step (a).

5. Process according to claim 1, wherein the structured element is a monolith or is cross-corrugated.

6. Process according to claim 2, wherein steam and/or carbon dioxide is added to the adiabatic reaction sections.

7. Process according to claim 1, wherein the reaction sections also contain steam reforming catalyst attached to the tube wall or catalyst attached to structures attached to the tube wall.

* * * * *